United States Patent
Ishii et al.

(10) Patent No.: US 11,061,224 B2
(45) Date of Patent: Jul. 13, 2021

(54) OPTICS OF WEARABLE DISPLAY TO INCREASE EYE-BOX

(71) Applicants: Fusao Ishii, Pittsburgh, PA (US); Mikiko Nakanishi, Tokyo (JP); Kazuhiko Takahashi, Tokyo (JP); Yuji Aburakawa, Tokyo (JP); Keiichi Murakami, Tokyo (JP)

(72) Inventors: Fusao Ishii, Pittsburgh, PA (US); Mikiko Nakanishi, Tokyo (JP); Kazuhiko Takahashi, Tokyo (JP); Yuji Aburakawa, Tokyo (JP); Keiichi Murakami, Tokyo (JP)

(73) Assignees: Fusao Ishii, Pittsburgh, PA (US); NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/842,774

(22) Filed: Dec. 14, 2017

(65) Prior Publication Data
US 2020/0409143 A1    Dec. 31, 2020

Related U.S. Application Data

(60) Provisional application No. 62/498,140, filed on Dec. 15, 2016.

(51) Int. Cl.
G02B 27/00    (2006.01)
G02B 27/01    (2006.01)
G02B 27/30    (2006.01)

(52) U.S. Cl.
CPC ..... *G02B 27/0081* (2013.01); *G02B 27/0172* (2013.01); *G02B 27/30* (2013.01); *G02B 2027/0105* (2013.01); *G02B 2027/0174* (2013.01); *G02B 2027/0178* (2013.01)

(58) Field of Classification Search
CPC .......................... G02B 27/0081; G02B 27/30; G02B 27/0172; G02B 2027/0105; G02B 2027/0178; G02B 2027/0174; G03H 2222/50; G03H 2222/53; G03H 2222/54
See application file for complete search history.

(56) References Cited

U.S. PATENT DOCUMENTS

| | | | |
|---|---|---|---|
| 9,529,191 B2* | 12/2016 | Sverdrup | G02B 27/0172 |
| 2010/0149946 A1* | 6/2010 | Yamamoto | G11B 17/022 369/103 |
| 2015/0346490 A1* | 12/2015 | Tekolste | G02B 5/1842 349/11 |
| 2016/0147062 A1* | 5/2016 | Yamakawa | G09G 3/002 348/203 |
| 2017/0227771 A1* | 8/2017 | Sverdrup | G02B 5/289 |
| 2017/0293147 A1* | 10/2017 | Tremblay | G02B 26/0833 |
| 2018/0084232 A1* | 3/2018 | Belenkii | H04N 13/324 |

\* cited by examiner

*Primary Examiner* — Darlene M Ritchie
(74) *Attorney, Agent, or Firm* — Bo-In Lin

(57) ABSTRACT

A see-through image display system having an Exit-Pupil-Expander (EPE) to enlarge the eyebox of display is disclosed. The EPE uses a hologram functioning as a microlens-array as well as collimation lens.

5 Claims, 17 Drawing Sheets

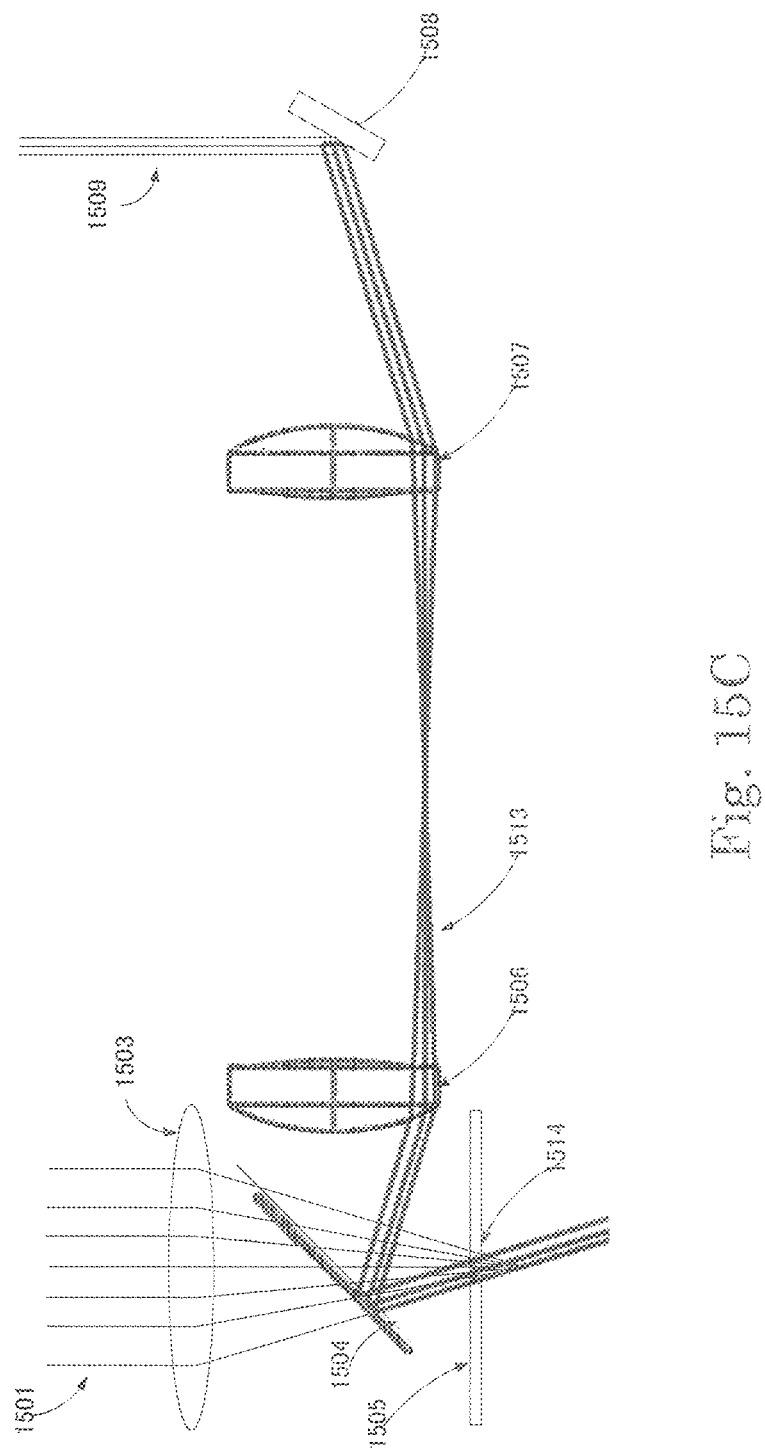

OPTICS OF WEARABLE DISPLAY TO INCREASE EYE-BOX

CROSS REFERENCE TO RELATED APPLICATIONS

This application is a Non-Provisional application that claims a Priority Date of a previously filed Provisional Application 62/498,140 filed on Dec. 15, 2016. This application and Provisional Application 62/498,140 are a Continuation in Part (CIP) of Patent application PCT/US2014/000153 filed on Jun. 27, 2014, which is a Non-Provisional filing of a Provisional Application 61/957,258 filed on Jun. 27, 2013.

TECHNICAL FIELD

This invention relates to a display system for projecting an image to a see-through display. The objective of this invention is to create a compact and low cost EPE (exit-pupil-expander) for a projection display such as eye-glass display and Head-up Display to enlarge the eye-box of display.

BACKGROUND ART

Wearable displays get attention in recent years after smart phones are well accepted by the market. Wearable displays provide hands free operation as well as showing image in the distance same as regular sight. There are tremendous needs for wearable displays. However in the past, near eye displays such as Head Mount Display, Head up Display and Eye Glass Type Display not necessarily satisfied viewers, because they were often too heavy, too large, too dark, low resolution, not see through, expensive and small size of image. There are needs for light, small, bright, high resolution, see-through, stealth, inexpensive and large image. This invention provides a new display system which satisfies all of these needs.

As shown in FIG. 1 and FIG. 1A, Kasai et al. disclosed in U.S. Pat. No. 7,460,286 an eye glass type display system that implements see-through capability with a holographic optical element. This display system projects images in the normal direction from display device, more particularly perpendicular direction for a surface of LCD display, and projected light containing an image is led into optical wave guide and reflected toward the eye of viewer. Because of waveguide, the field of view and resolution are very limited.

As shown in FIG. 2 and FIG. 2A, Mukawa et al. in SID 2008 Digest, ISSN/008-0966X/08/3901-0089, "A Full Color Eyewear Display using Holographic Planar Waveguides", disclose an eye glass type display system that implements see-through capability with two plates of holographic optical elements. This system also uses a waveguide which limits resolution and field of view.

As shown in FIG. 3, Levola in SID 2006 Digest, ISSN0006-64•SID 06 DIGEST 0966X/06/3701-0064, Novel Diffractive Optical Components for Near to Eye Displays discloses another implementation locating LCD device in the middle of two eyes, but still it requires large protruded space which enlarge the form factor. The above three types of displays are using either holographic optical element (HOE) or diffractive optical element (DOE) and all of these have some fundamental difficulties of large chroma aberration, cross talk of colors, large field curvature aberration and distortion aberration. Mukawa et al. explained how to reduce cross talk of colors using multiple wave guides, which makes the system heavier and thicker and the efficiency of utilization of light will be lower. Kasai et al. used a single HOE which helped to improve the efficiency of light utilization, although the other aberrations remained and the FOB (field of view) has to be small so that these aberrations will not be conspicuous. This invention will show how these difficulties will be removed.

As shown in FIG. 4 and FIG. 4A, Li et al. disclosed in U.S. Pat. No. 7,369,317 a compact display and camera module attachable to eye glasses. This also requires a thick PBS (polarized beam splitter) and the FOB (field of view) is rather small and this is not stealth and the presence of display is very obvious.

The examples such as FIG. 1 and FIG. 2 successfully demonstrated to public that a wearable display with see-through image is possible using holograms and wave guides. However both of them used LCD as a display and they had a bulky display and optical portions which could not fit inside a temple of glasses. On the other hand, as shown in FIG. 7 and FIG. 8, a compact laser beam scanner (LBS) using only one mirror driven by either electro-static or magnetic forces was developed and it is substantially compact compared with a 2D pixel array type of display, but the beam projected from LBS is very narrow in principle and it creates an extremely small eye-box wherein a viewer can see an image as shown in FIG. 8. Eyebox is defined as a box (width×length×height) in space wherein an image is visible to a viewer as shown in FIG. 9. A small eyebox means that a display is moved in a small distance and a viewer will lose an image. This requires a tight positioning for a viewer to hold a display and often causes uncomfortable viewing. If a display has a large eyebox, a viewer can move freely within the eyebox without losing an image. A LBS projects a very narrow beam to achieve a high resolution image. If the beam is reflected and scattered by a screen, it will provide a large eyebox for a viewer. But if it is used as a direct retina display (meaning that a narrow beam is directly lead into an eye and hits the retina of viewer), a slight shift of beam will cause the loss of image.

FIG. 9 shows an example of Exit Pupil Expander (EPE) which enlarges the eyebox of display. A pair of micro-lens-array (MLA) is used for an EPE as shown in FIG. 10. When such an EPE is combined with a relay lens described in FIG. 9, a unit of head mount display becomes rather large as FIG. 11 in spite of a small display device as LBS.

Therefore, there is a need to reduce the size of EPE and optics for wearable display using LBS. This invention provides a new and improved apparatuses and methods as solutions to satisfy this need.

SUMMARY OF THE INVENTION

The objective of this invention is to create a compact and low cost EPE (exit-pupil-expander) for a projection display such as eye-glass display and Head-up Display to enlarge the eye-box of display.

As illustrated in FIG. 11 FIG. 13, one of embodiments of this invention is an EPE comprising multiple minute holes which cause Fraunhofer diffraction in a light shield so that incident light beams will diverge through the holes.

Another example is an EPE using a hologram recorded with a pair of coherent beams wherein one beam is converging and the other is collimated from a same direction as illustrated in FIG. 14.

Another example is an EPE made of a hologram recorded with a pair of coherent beams wherein one beam is converging and the other is collimated but the incident angle to

BRIEF DESCRIPTION OF THE DRAWINGS

FIG. 14 illustrates how such a hologram can be recorded. The laser beams marked 1401 and 1402 are incoming coherent beams and one of them is converging and the other is a collimated light beam and both of them are entering a hologram from a same direction so that the EPE is transmissive. 1404 is a half-mirror so that two incoming light beams are combined.

DETAIL DESCRIPTIONS OF THE PREFERRED EMBODIMENTS

Figure 1:
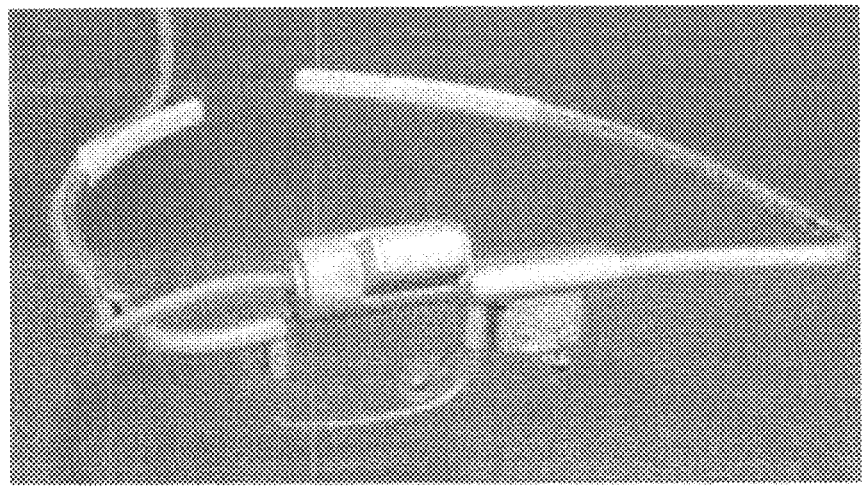
FIG. 1 is a cross sectional view of an image display system of prior art shown by Kasai in his published technical report related to U.S. Pat. No. 7,460,286.
Figure 1A:
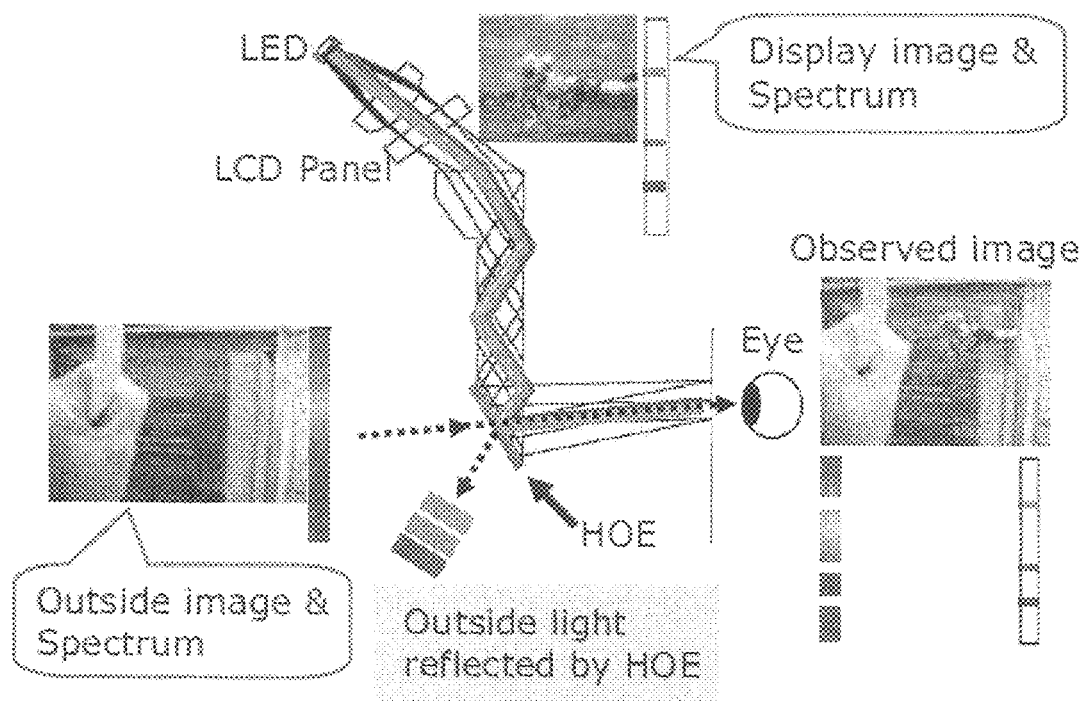
FIG. 1A is a photo of the actual sample which successfully demonstrated see-though capability.
Figure 2:
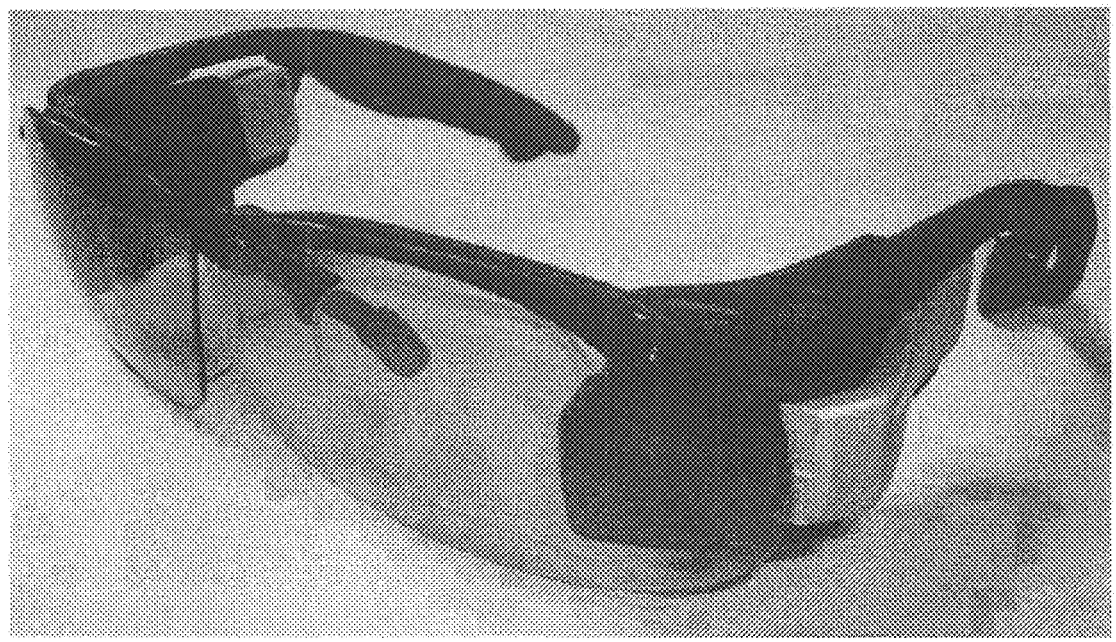
FIG. 2 and FIG. 2A are shown by Mukawa et al. in SID 2008 Digest, ISSN/008-0966X/08/3901-0089, "A Full Color Eyewear Display using Holographic Planar Waveguides". The sample of wearable display in FIG. 2A successfully demonstrated see-through capability.
Figure 2A:
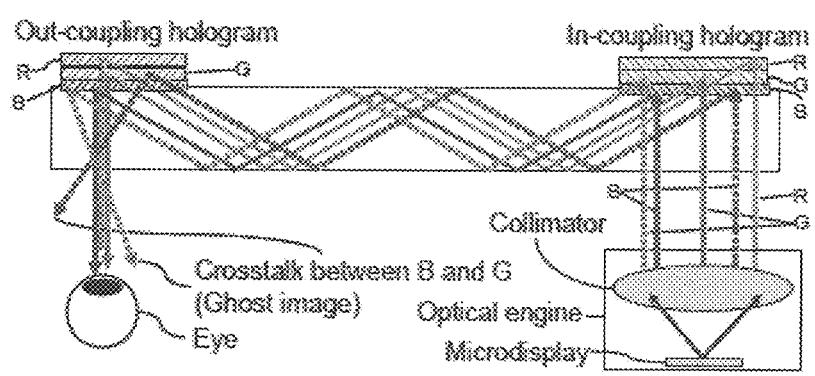
Figure 3:
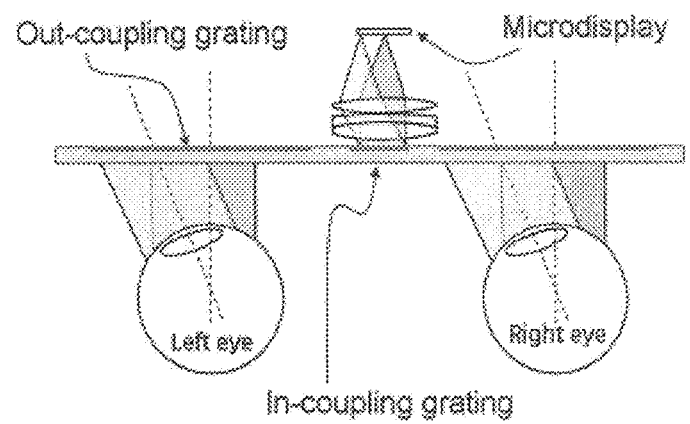
FIG. 3 is another example of prior art and reported by Levola at SID 2006 Digest, ISSN0006-64•SID 06 DIGEST 0966X/06/3701-0064, Novel Diffractive Optical Components for Near to Eye Displays.
Figure 4:
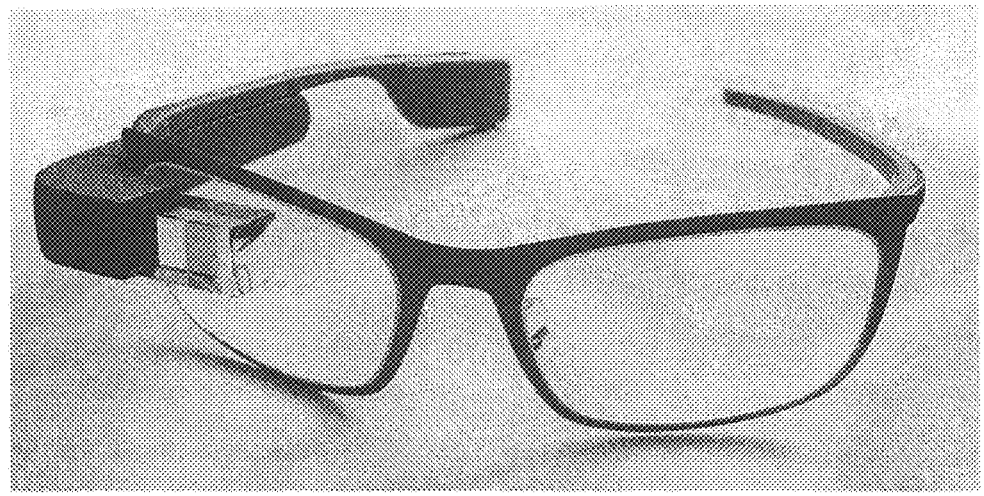
FIG. 4 shows another prior art of wearable display with see-through capability having both a display and a camera described in U.S. Pat. No. 7,369,317.
Figure 4A:
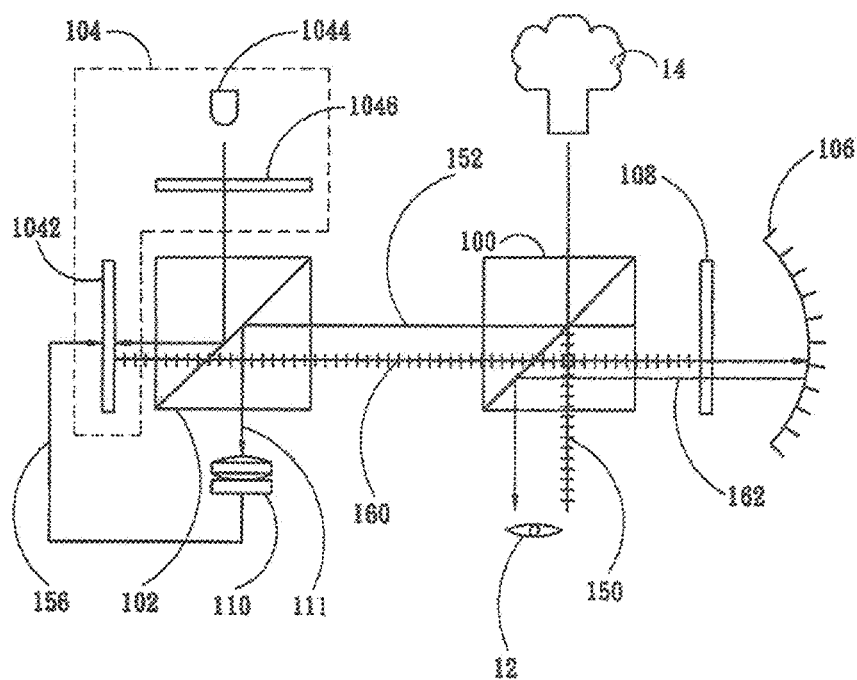
FIG. 4A is an example using a similar configuration of optics.
Figure 5:
FIG. 5 shows examples of eyeglasses having temples large enough to embed all optics and electronics of this invention. so that the existence of display is not noticeable.

The objective of this invention is to provide a display apparatus that includes an EPE (exit-pupil-expander) using a hologram to achieve a low cost and compact display such as a wearable display. Specifically, FIG. 5 shows two exemplary eyeglasses comprise temples that are large enough to embed all optics and electronics of this invention. The eyeglasses have the advantages that the wearable display embedded in the eyeglasses is not noticeable.

Figure 6:
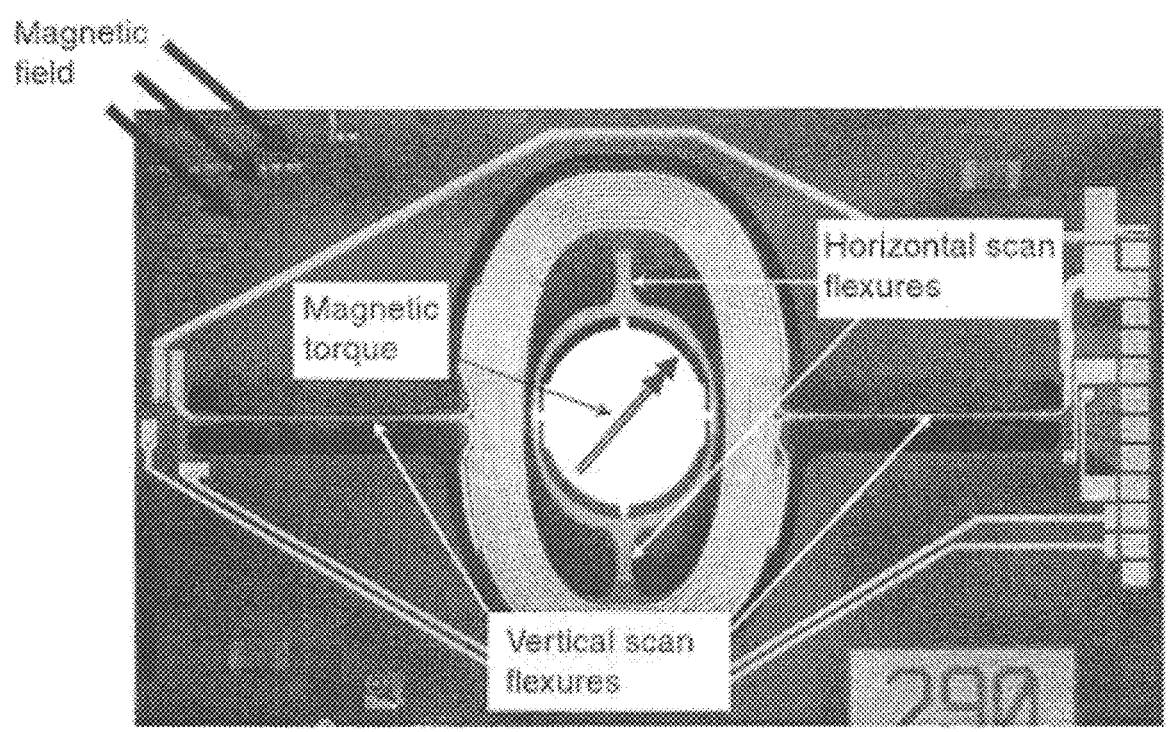
FIG. 6 is an example of laser beam scanner (LBS), wherein there is a Ginbal mirror (marked as "Horizontal scan flexures") which scan a beam horizontally and another flexures marked as "Vertical scan flexures" which scan the beam vertically. The laser beam is scanned horizontally and vertically to create 2 dimensional pictures.
Figure 7:
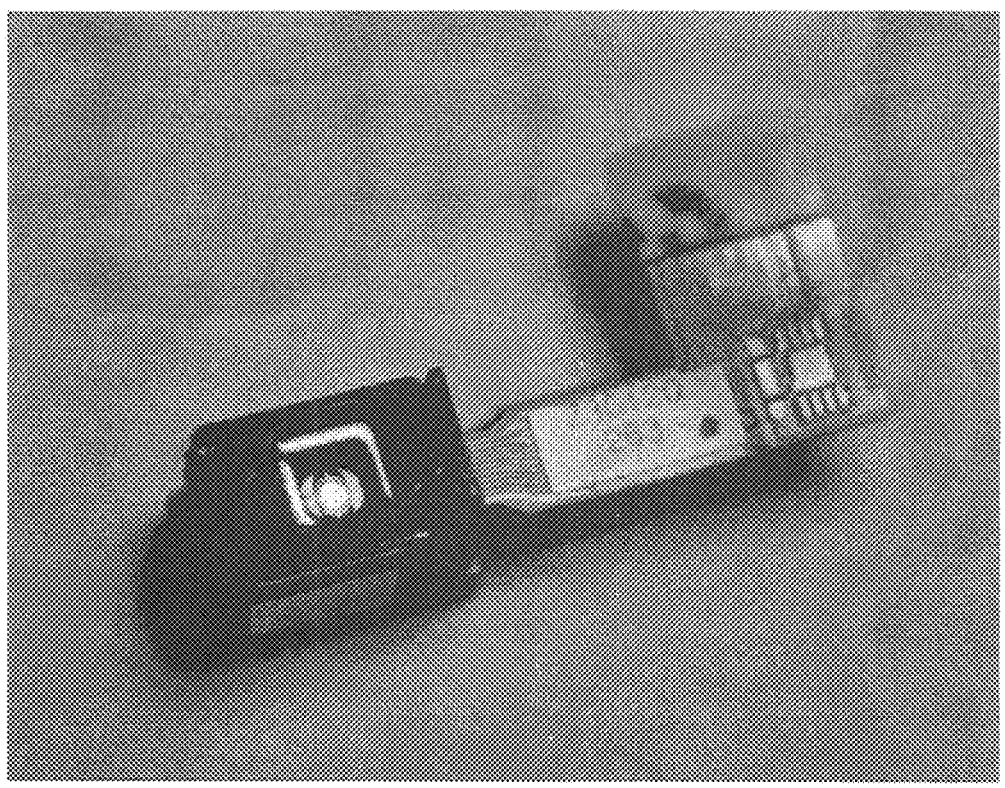
FIG. 7 shows an example of LBS unit with a circuit to drive.
Figure 8:
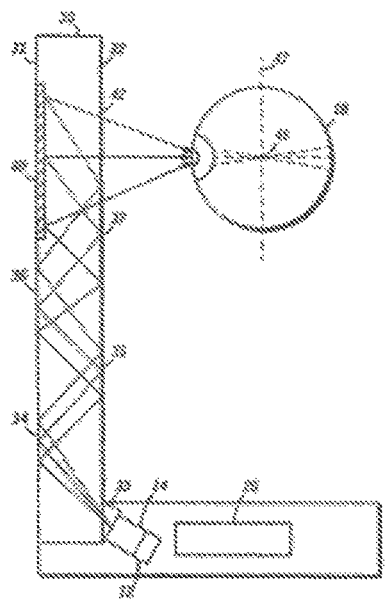
FIG. 8 is an example of a retina display which directly projects a laser beam into the retina of human eye. But this display has an extremely small eyebox and a slight movement of eye will cause missing image, because incoming light beam is very narrow and the pupil of observer is very small (2 to 3 mm diameter). This requires to increase the eyebox.
Figure 9:
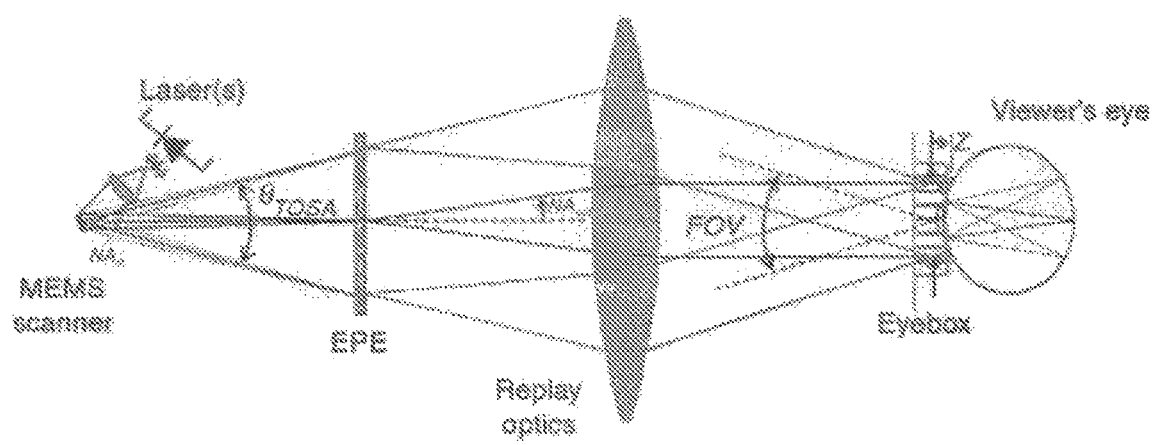
FIG. 9 shows an example of a display using a LBS, an Exit Pupil Expander (EPE) and a set of relay lenses to provide a large eyebox to a viewer. This prior art is too large in front of human eye and it is difficult to use as a see-though-display.
Figure 10:
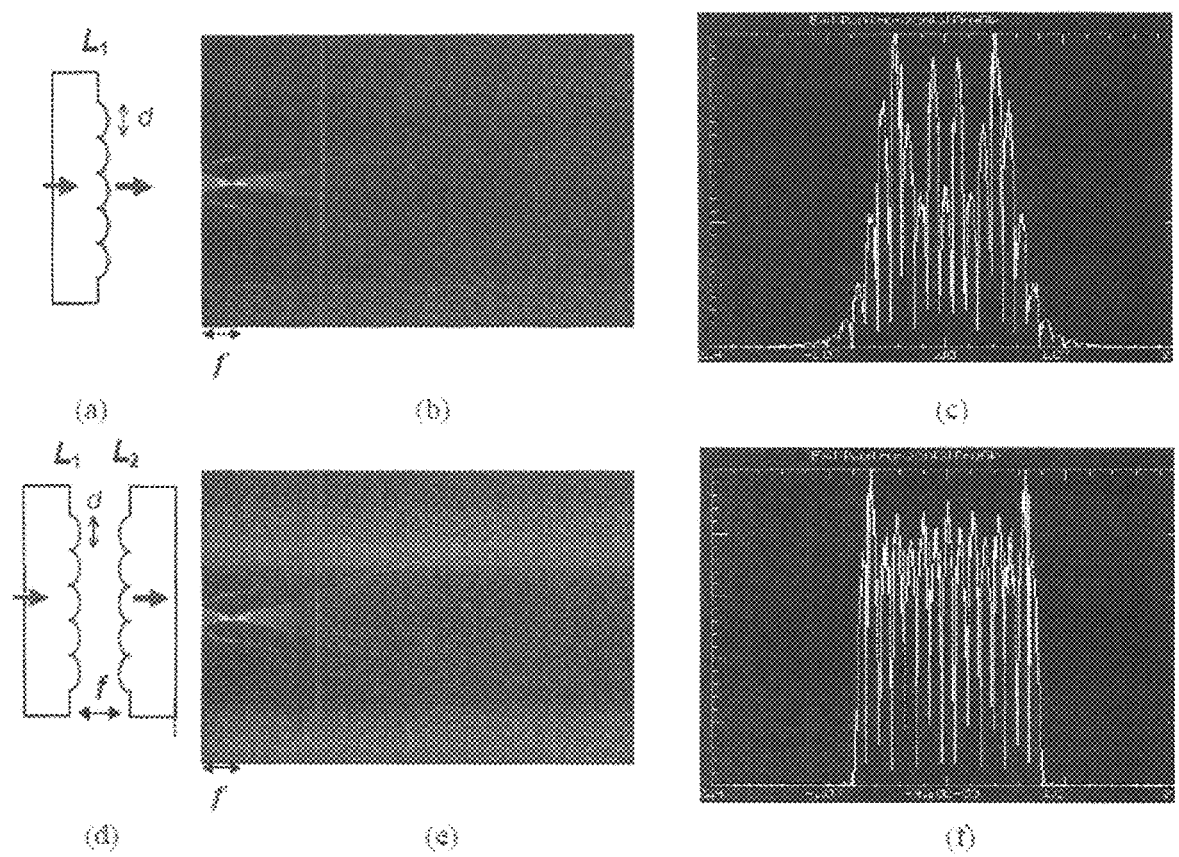
FIG. 10 shows that two micro-lens-arrays (MLA) are used as an EPE. (a) is a single micro-lens-array where each micro-lens diverges incoming light but the uniformity of intensity (b) is not good enough (c) because of the rough pitch of micro-lens. (d) shows a dual micro-lens-array (d) system which shows a substantial improvement of the uniformity of intensity (f).
Figure 11:
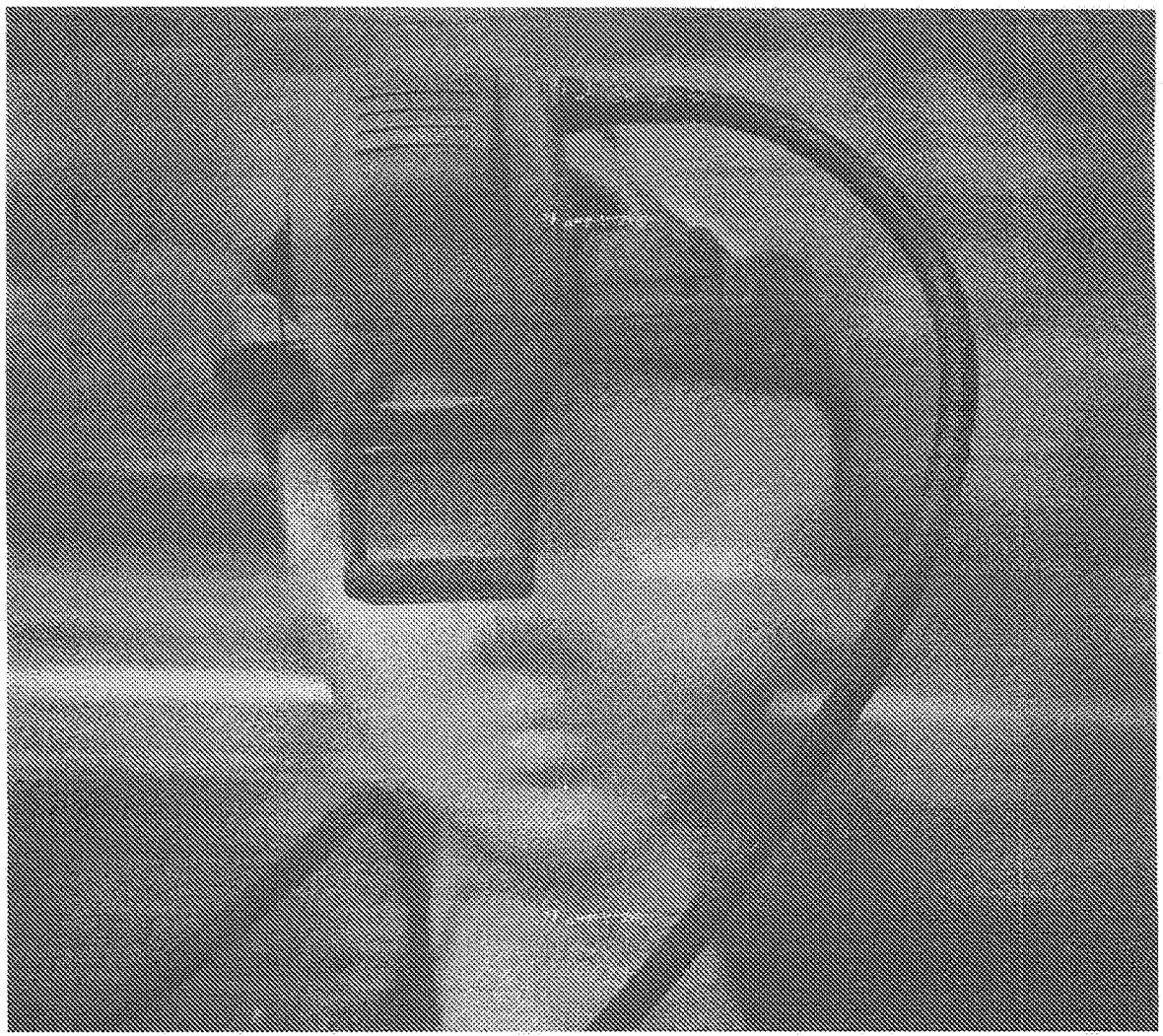
FIG. 11 shows an example of head mount display using a LBS, EPE and Relay lenses.

FIG. 6 is an example of laser beam scanner (LBS), wherein there is a Ginbal mirror (marked as "Horizontal scan flexures") which scan a beam horizontally and another flexures marked as "Vertical scan flexures" which scan the beam vertically. The laser beam is scanned horizontally and vertically to create 2 dimensional pictures.

Figure 12:
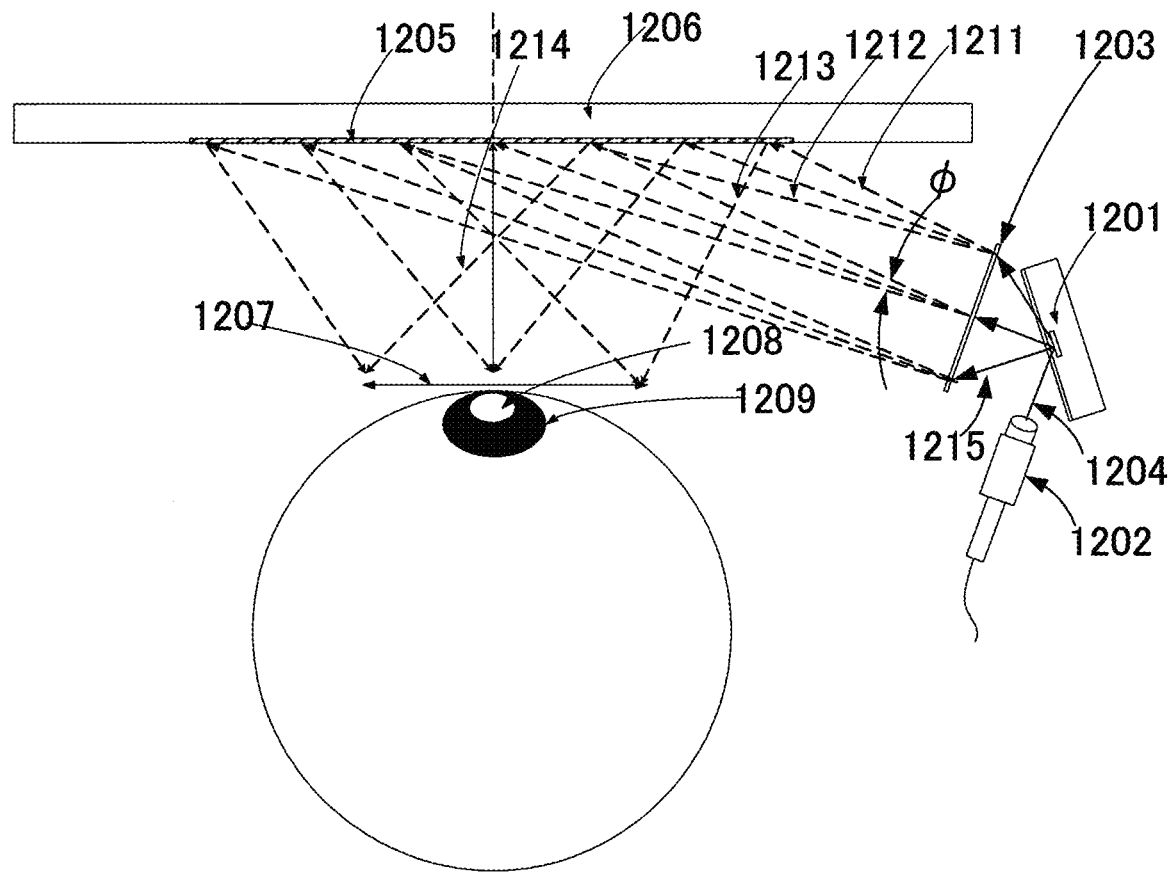
FIG. 12 shows an example of this invention which provides a very small EPE (1203) and a combiner lens (1206) compared with the prior arts such as FIG. 9. The EPE (1203) is explained for more details in FIG. 13.

FIG. 12 shows an example of embodiment of this invention. A hologram plate (1203) is used to expand the exit pupil of projected image from a laser beam scanner LBS (1201). A laser light source (1202) contains a multiple color (usually three colors) beam (1204) and projects to the LBS (1201). The beam must be as narrow as possible so that the image can achieve high resolution. The LBS scans the beam (1215) to create an image on the hologram plate (1203). The hologram is designed to diverge the incoming laser beam (1215) to divergent beams (1211, 1212 and 1213) in an angle shown as φ in FIG. 12. These divergent beams are reflected by another holographic element (1205) toward the eye (1209) as shown with the beam (1214). This divergent angle (φ) determines the size of eye-box (1207) wherein the beams enter the pupil (1208) at the iris (1209) and the image is visible to a viewer and The hologram (1203) can function to diverge the incoming beam (1215) as a micro-lens-array and also function as a relay-lens. The diverging beams are projected onto a combiner (1206) which reflects the divergent beams and creates a virtual image in a distance in front of the viewer. The combiner can be a hologram, a DOE or a Fresnel mirror. To improve resolution, additional lenses can be added between the combiner and the EPE.

Figure 13:
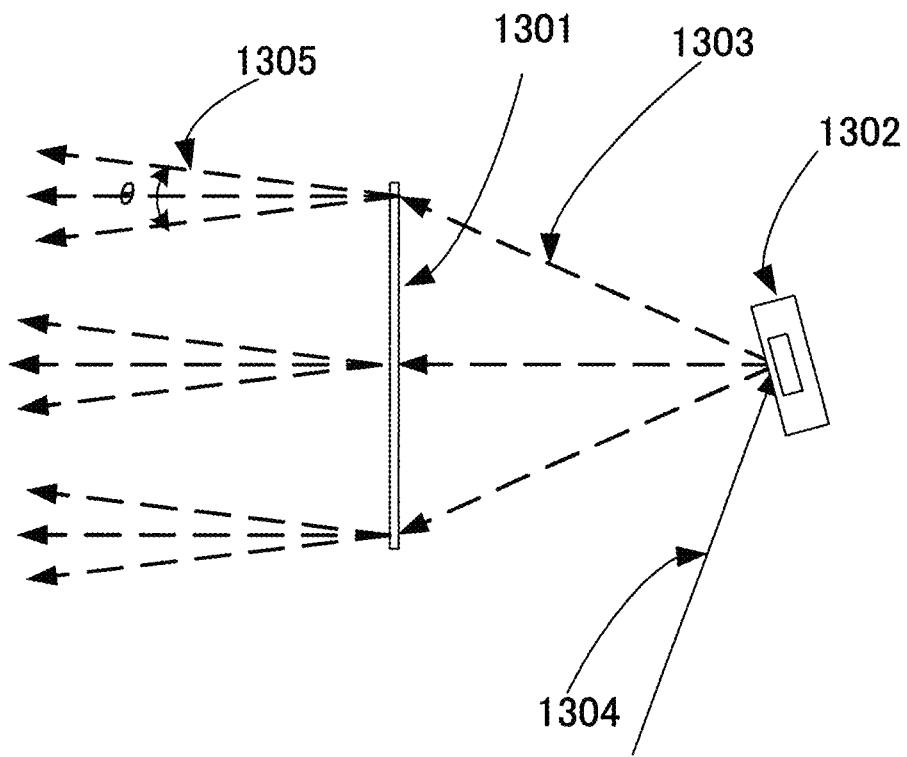
FIG. 13 shows an example of this invention wherein an EPE (1301) which comprises a light shield with multiple holes (1306) small enough to cause incoming laser beam to diffract (1305) by Fraunhofer diffraction and a holographic optical element (HOE) to collimate the incoming divergent light beams.
Figure 13:
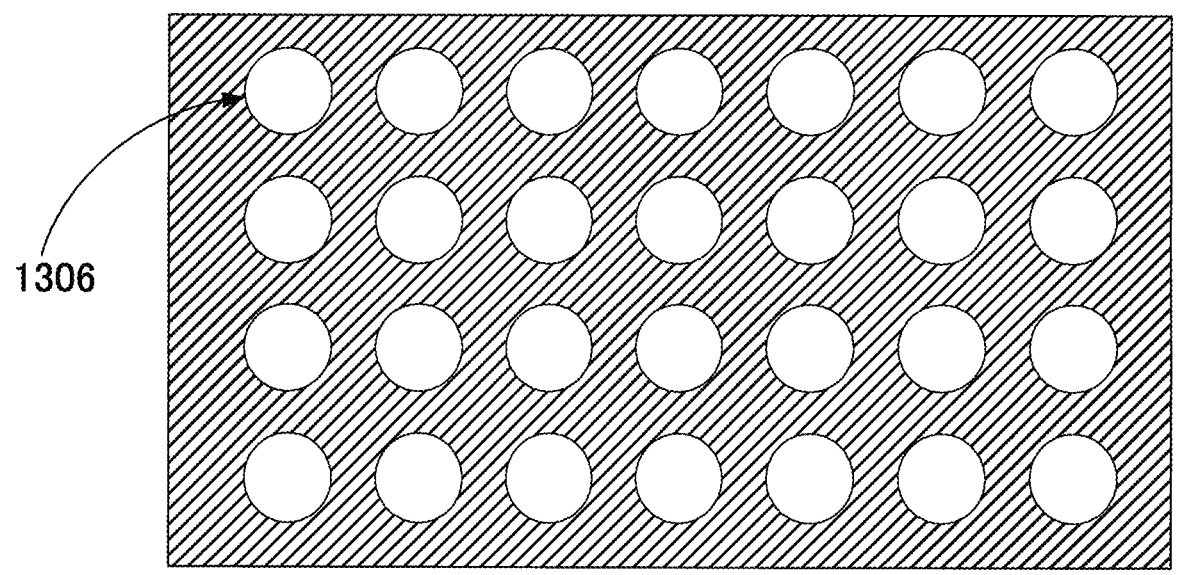

Another example of embodiments is illustrated in FIG. 13. An incoming light beam (1304) enters a LBS (laser beam scanner, 1302). An EPE plate (1301) comprises a light shield (1306) and many minute holes whose size is as small as several microns so that the incident light beams (1303) will be diffracted by Fraunhofer diffraction and the outgoing beams (1305) are divergent. The divergent angle (θ) is determined by the size of holes. The smaller size provides the larger divergent angle. Thus the divergent angle can be controlled. Not only diverging the incident beams, but also it is possible to focus the incoming beams by adding a hologram to the EPE plate, as if a relay lens is added.

Figure 14:
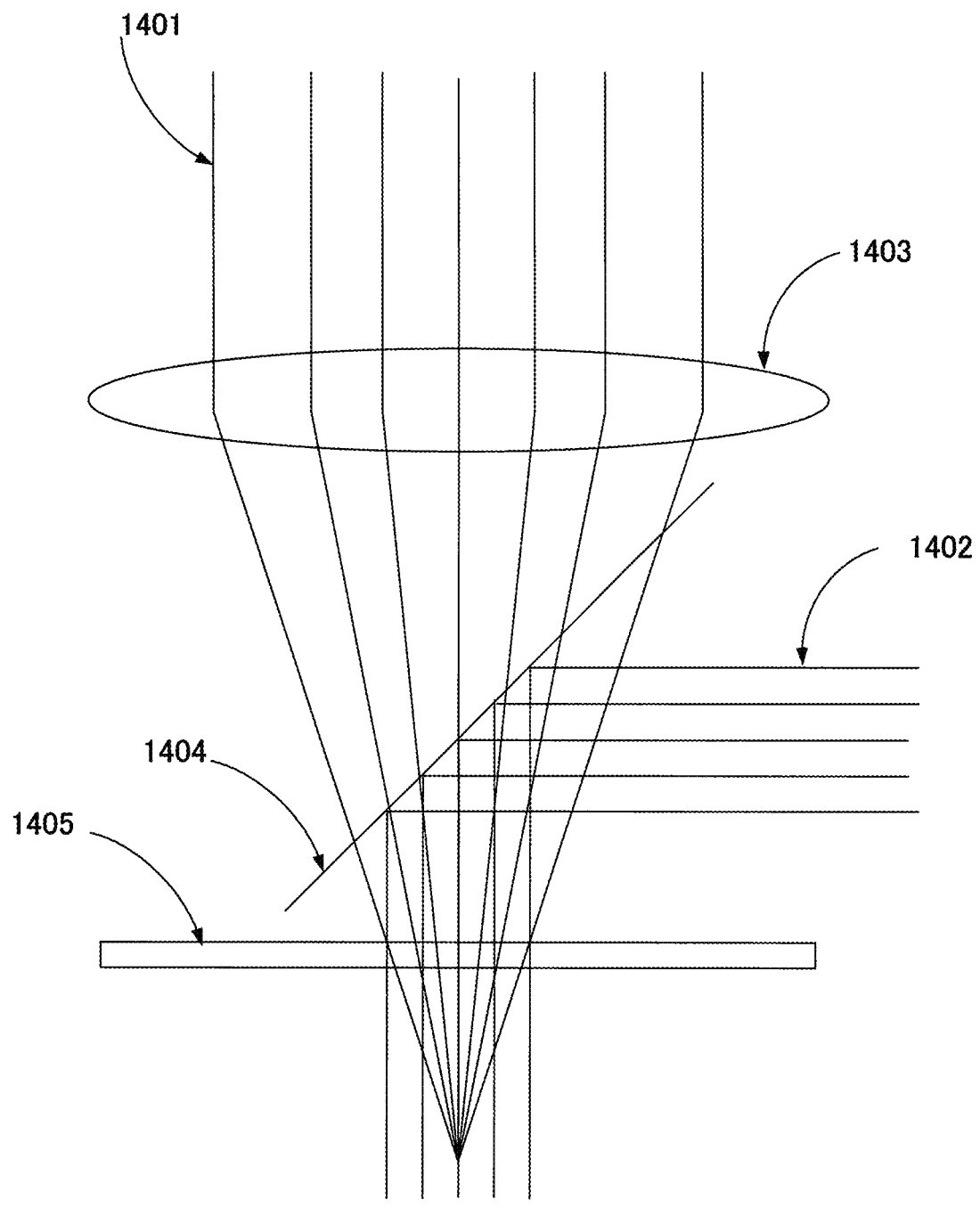
FIG. 14 shows an example of embodiments of this invention. An EPE made of hologram comprising an array of minute holograms which receives a collimated light beam and transmits a divergent light beam.

Another example of embodiments of this invention is illustrated in FIG. 14. This example shows a method to produce an EPE with a hologram without light shield as the previous example. A pair of coherent and collimated laser beams (1401 and 1402) are prepared. One of the beams (1401) is converging through a focusing lens (1403). The other beam (1402) is a collimated parallel beam. Both the beams must be combined and projected to a hologram (1405) for recording. This hologram (1405) is transmissive, therefore a reference beam (1402) and an object beam (1401) must enter a hologram from a same direction. This example uses a half-mirror (1404) to combine the two beams. A Single exposure (recording of hologram) creates a single minute lens and the process has to be repeated to create a lens-array and often multi-million times of exposures are required. Each exposure can be done by a short pulse and it is not difficult to expose in few kilo Hz. A hologram can be wrapped around a cylinder and the cylinder can be rotated in a constant speed and the optical setting as shown in FIG. 14 can expose the hologram with a pulsed laser. Even 1 kHz of pulsed laser can expose one million lenses in 17 minutes.

Figure 15:
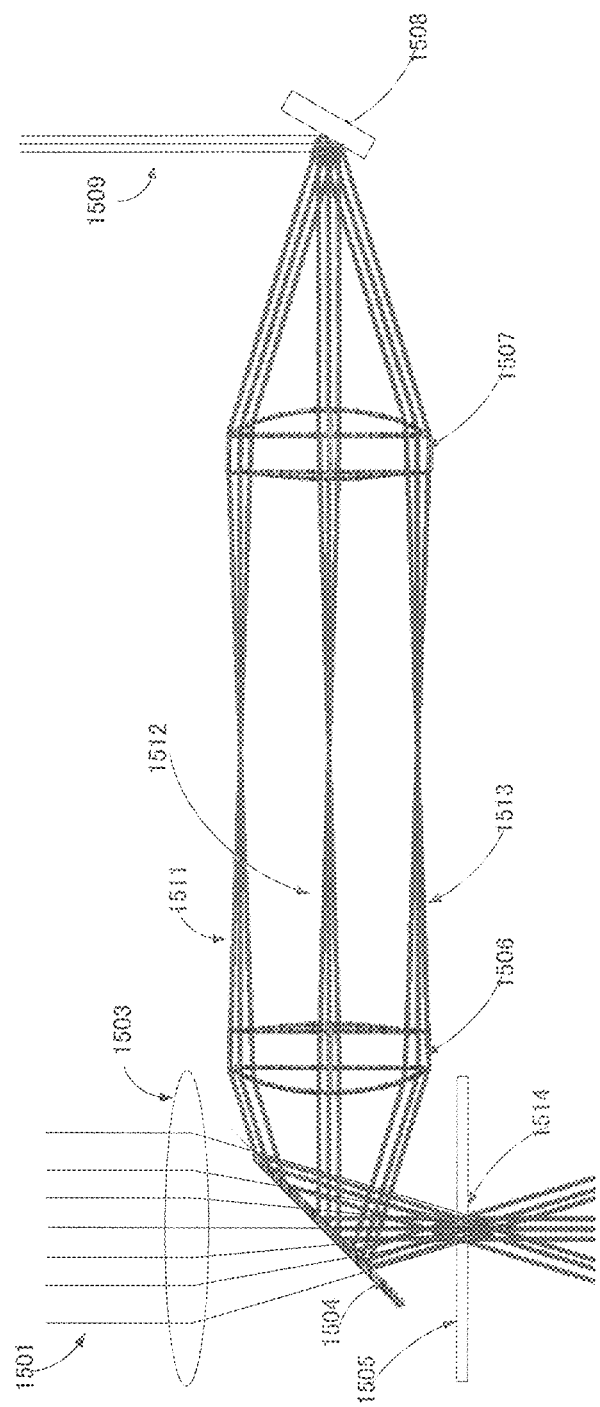
FIG. 15 shows another example of embodiments of this invention wherein the EPE marked 1505 is made of a hologram that is exposed for recording with a stationary converging beam (1501) and a moving collimated beam (1511,1512 and 1513) that is moved by a MEMS scanner (1508) as shown in FIG. 15A (1511), FIG. 15B (1512) and FIG. C (1513).
Figure 15A:
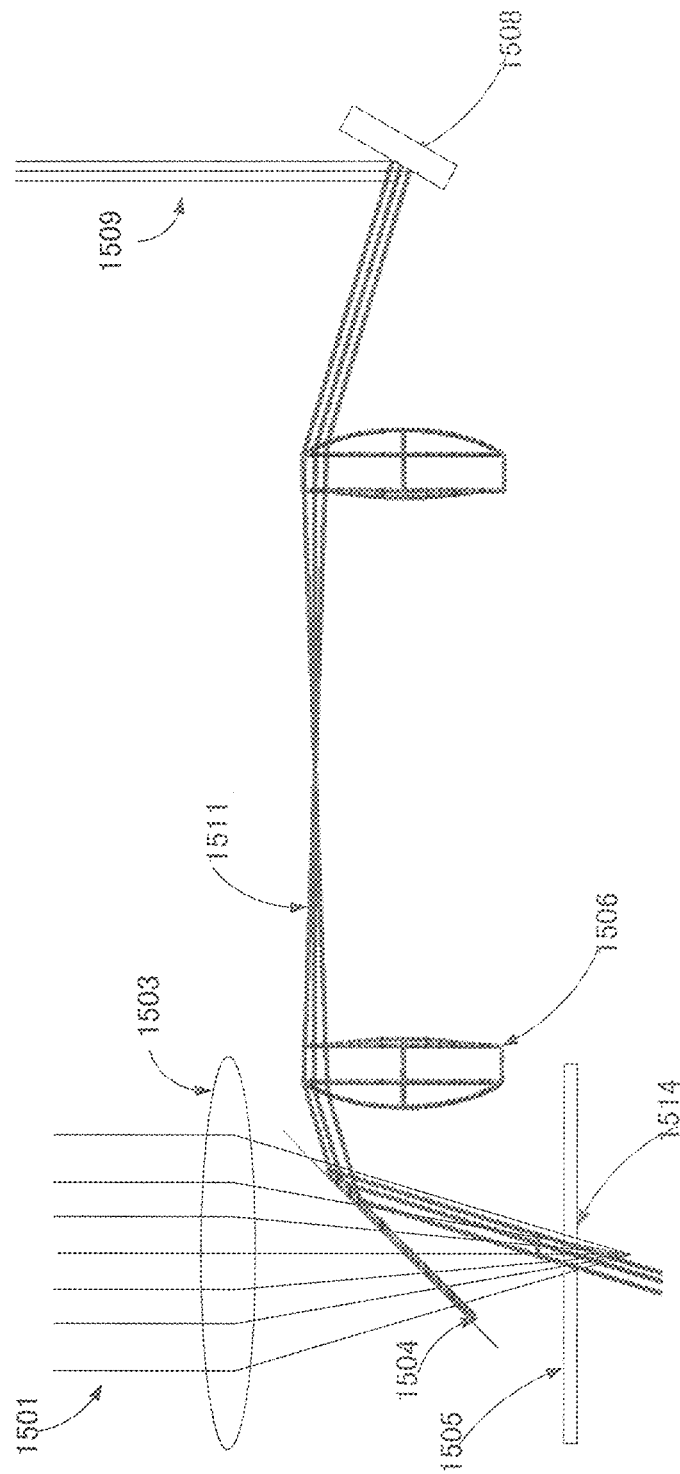
Figure 15B:
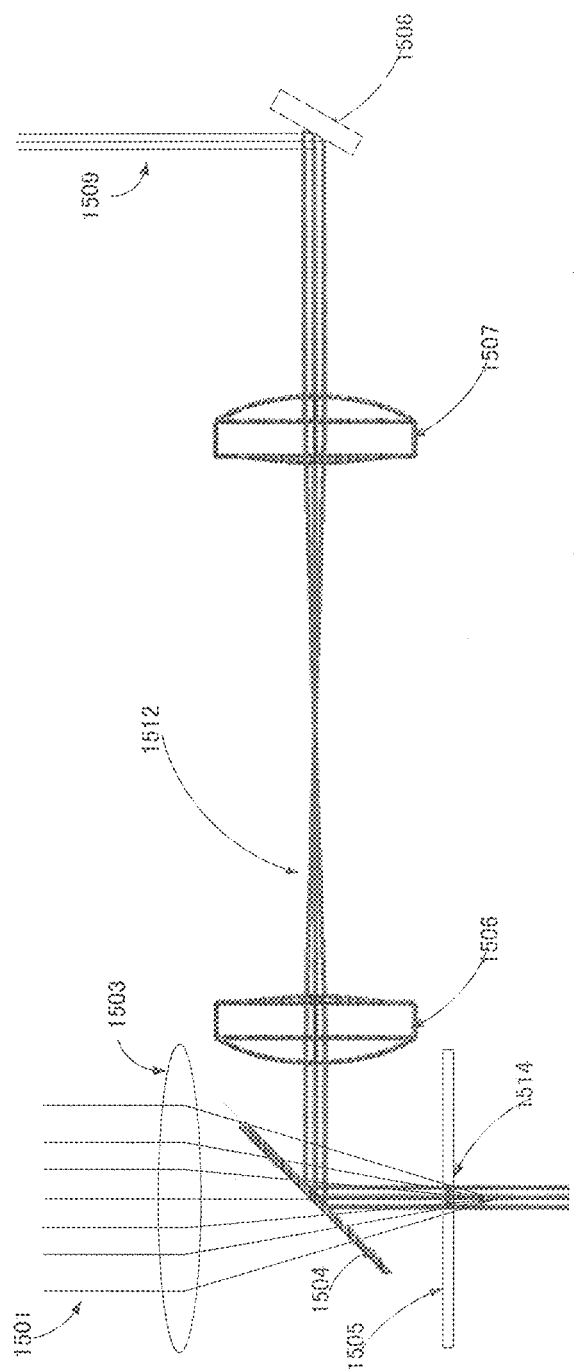

Another example (1508) of embodiments of this invention is illustrated in FIG. 15. This example enables a hologram (1505) having a function of micro-lens-array for diverging an incoming beams and also having a relay-lens function. A pair of coherent and collimated beams are shown as (1501) and (1509). One of the beams (1501) is converging through a focusing lens (1503). The other beam is reflected by an LBS (1508) and lead to a pair of FΘ lens (1506 and 1507) as shown as the beams (1511, 1512 and 1513) and the collimated light beams will always pass through the aperture (1514) which the first beam (1501) exposes regardless of the incident angle (FIG. 15A, FIG. 15B and FIG. 15C). The incident angle of the second beam (1509) is determined by the angle of the mirror of LBS (1508) and the half-mirror (1504) and it can be controlled arbitrarily for each location of micro-lens in the array. This means that the macro-lens comprising millions of micro-lenses can be free-form lens. Therefore, according to the above drawings and descriptions, in preferred embodiments, this invention discloses a see-through display system that includes a:display device from a group containing LCD, LCOS, Micromirror, Microshutter, OLED and laser beam scanner; a circuit to drive said display device; light Source(s) having light emitting device(s) from a group containing Laser, LED and OLED; a combiner lens that combines an external image and a display image; and an Exit-Pupil-Expander (EPE) to enlarge the eyebox of image comprising a hologram wherein said hologram is recorded in an array by a pair of beams and one of the beams is converging and the other beam is collimated and these two beams are exposed from a same side. In another preferred embodiment, the see-through display system wherein the incident angle of the collimated light beam is controlled by the location of exposure so that the hologram bends the incident beam from arbitrary direction. In another embodiment, this invention further discloses a see-through display system that includes a display device from a group containing LCD, LCOS, Micromirror, Microshutter, OLED and laser beam scanner; a circuit to drive said display device; light source(s) having light emitting device(s) from a group containing Laser, LED and OLED; a combiner lens that combines an external image and a display image; and an Exit-Pupil-Expander (EPE) to enlarge the eye0box of image comprising a light shield with multiple holes of which sizes are small enough to cause Fraunhofer diffraction to diverge the incident beams. In another preferred embodiment, the EPE has a hologram which bends the principal ray of incident light to arbitrary direction. In another preferred embodiment, the EPE has a diffuser plate which diverges incident light.

Though the invention has been described with respect to specific preferred and alternative embodiments, many additional variations and modifications will become apparent to those skilled in the art upon reading the present application. Thus it is the intention that the appended claims be interpreted as broadly as possible in view of the prior art to include all such variations and modifications

We claim:

1. A see-through display system comprising:
a light source for emitting a multi-color light beam toward a laser beam scanner (LSB), wherein the LSB scans the multi-color light beam as a plurality of scanned beams toward a diverging hologram plate;
the diverging hologram plate diverges the scanned beams into divergent beams with a predesignated divergent angle for projecting toward a combiner plate, the combiner plate reflecting the divergent beams to create a virtual image and combining with an external image to create a combined image in front of an eye-pupil with a predefined size of an eye-box corresponding to the divergent angle of the diverging beams;
wherein the divergent hologram plate further comprises a light shield with many holes with a size of several microns to diverge the scanned beams by Fraunhofer diffraction.

2. The see-through display system of claim 1, wherein:
the combiner plate comprises another hologram plate having hologram elements creating the virtual image and combining with the external image to create the combined image in front of the eye-pupil.

3. The see-through display system of claim 1, wherein:
the combiner plate further comprises a Fresnel mirror for creating the virtual image and combining with the external image to create the combined image in front of the eye-pupil.

4. The display system of claim 1, wherein:
the combiner plate further comprises a diffractive optical element (DOE) for creating the virtual image and combining with the external image to create the combined image in front of the eye-pupil.

5. The display system of claim 1, wherein:
the light source further includes a laser light source selected from a group consisting of a laser, light emitting diode (LED) and organic light emitting diode (OLED).

* * * * *